United States Patent
Iida

(10) Patent No.: US 7,627,288 B2
(45) Date of Patent: Dec. 1, 2009

(54) WIRELESS COMMUNICATION APPARATUS

(75) Inventor: Izumi Iida, Shiojiri (JP)

(73) Assignee: Seiko Epson Corporation (JP)

( * ) Notice: Subject to any disclaimer, the term of this patent is extended or adjusted under 35 U.S.C. 154(b) by 584 days.

(21) Appl. No.: 11/550,608

(22) Filed: Oct. 18, 2006

(65) Prior Publication Data

US 2007/0254726 A1    Nov. 1, 2007

(30) Foreign Application Priority Data

Oct. 19, 2005 (JP) ............................. 2005-304314
Aug. 23, 2006 (JP) ............................. 2006-226007

(51) Int. Cl.
*H04B 5/00* (2006.01)

(52) U.S. Cl. ...................... 455/41.1; 455/572; 455/573; 455/343.1; 455/182.1; 455/182.2; 455/183.1; 340/10.1; 340/10.3; 340/10.34; 340/10.4; 340/870.31; 340/870.4

(58) Field of Classification Search ................ 455/41.1, 455/572, 573, 127.1, 343.1–343.6, 82–86, 455/182.1, 182.2, 183.1; 340/10.1, 10.3, 340/10.34, 10.4, 870.3, 870.31, 870.39, 870.4

See application file for complete search history.

(56) References Cited

U.S. PATENT DOCUMENTS 5,649,295 A * 7/1997 Shober et al. .............. 340/10.1
5,940,447 A * 8/1999 Connell et al. .............. 375/316
6,498,923 B2 * 12/2002 Ikefuji et al. ................ 455/41.1
6,721,540 B1 * 4/2004 Hayakawa .................. 455/41.1
7,072,697 B2 * 7/2006 Lappetelainen et al. ..... 455/574
7,107,008 B2 * 9/2006 Wuidart ...................... 455/41.1

FOREIGN PATENT DOCUMENTS

| JP | 06-133476 | 5/1994 |
| JP | 09-103037 | 4/1997 |
| JP | 2005-073350 | 3/2005 |

* cited by examiner

*Primary Examiner*—Tuan A Tran
(74) *Attorney, Agent, or Firm*—Harness, Dickey & Pierce, P.L.C.

(57) ABSTRACT

An apparatus includes a wireless transmitter modulating a carrier wave by transmission data and wirelessly communicating a signal, a wireless receiver mixing the wireless transmitter signal and a carrier wave and receiving the transmission data, a power carrier wave clock generator provided on one of the wireless transmitter and receiver generating a power carrier wave clock, a non-contact power transmitter transmitting power between the wireless transmitter and receiver through electromagnetic induction from the power carrier wave clock, a carrier wave generator mounted on the one of the wireless transmitter or receiver, and generating a carrier wave based on the power carrier wave clock, and a carrier wave reproducer mounted on the other of the wireless transmitter or receiver, and reproducing a carrier wave having the same frequency as the carrier wave based on a clock having the same frequency as the power carrier wave clock.

5 Claims, 4 Drawing Sheets

WIRELESS COMMUNICATION APPARATUS

BACKGROUND

1. Technical Field

The present invention relates to a wireless communication apparatus, and in particular, to one that is suitably applied to a method of transmitting a reference clock used for wireless data communication in a non-contact manner, together with power.

2. Related Art

As a method that transmits power to an information terminal apparatus, such as a cellular phone, for the sake of charging, there is a method that transmits power using electromagnetic induction in a non-contact manner, in addition to a method that transmits power through a metal contact, such as a connector. The method that transmits power in a non-contact manner can have no poor contact by abrasion or stain and can maintain a waterproof property of a case, compared with the method that transmits power through the metal contact.

In JP-A-9-103037, there is disclosed a method that transfers power control information through an electromagnetic induction coil for power transmission such that a feedback control of supplied power can be performed without impairing the advantages of non-contact power feeding. Further, in JP-A-2005-73350, there is disclosed a method that provides a coil for data communication separately from a coil for power transmission in order to implement an electric tool that can perform optimum charging according to the state of a charger.

Meanwhile, in JP-A-6-133476, there is disclosed a method that performs wireless data communication using an antenna separately from a non-contact power transmission device so as to enable data communication, without being restricted by a power transmission side.

However, in the method that transmits power in the non-contact manner for the sake of charging or the like, in order to transfer mass image data stored in the information terminal apparatus, such as a digital camera or a cellular phone with a camera, to a personal computer, a connector for wired communication, such as a USB, is required, and thus there is a problem in that the above method cannot cope with transmission of mass image data.

In the methods disclosed in JP-A-9-103037 and JP-A-2005-73350, data communication is performed through a power transmission device, such as an electromagnetic induction coil, and thus there is a problem in that high-speed data communication cannot be performed.

In the method disclosed in JP-A-6-133476, a wireless machine is merely provided alone separately from the non-contact power transmission device, and thus there is a problem in that costs, power consumption, and the size are increased.

Meanwhile, in order to perform transmission of mass data, it is necessary to provide a local oscillator for generating a reference clock on transmitting and receiving sides. Further, it is necessary to provide an automatic frequency adjusting circuit or an A/D converter for adjusting a shift in frequency of the reference clock on the transmitting and receiving sides. Accordingly, there is a problem in that the size of the circuit is increased.

SUMMARY

An advantage of some aspects of the invention is to provide a wireless communication apparatus that can transmit power without causing poor contact, suppress an increase in size of a circuit, and implement high-speed data communication in a wireless manner.

According to a first aspect of the invention, a wireless communication apparatus includes a wireless transmitting unit that modulates a carrier wave by transmission data and performs wireless communication of a signals a wireless receiving unit that mixes the signal transmitted from the wireless transmitting unit in a wireless manner and a carrier wave having the same frequency component as the carrier wave and performs reception of the transmission data, a power carrier wave clock generating unit that is provided on one of the wireless transmitting unit and the wireless receiving unit so as to generate a power carrier wave clock, a non-contact power transmitting unit that transmits power between the wireless transmitting unit and the wireless receiving unit through electromagnetic induction generated by the power carrier wave clock, a carrier wave generating unit that is mounted on either the wireless transmitting unit or the wireless receiving unit where the power carrier wave clock generating unit is provided, and generates a carrier wave on the basis of the power carrier wave clock, and a carrier wave reproducing unit that is mounted on either the wireless transmitting unit or the wireless receiving unit where the power carrier wave clock generating unit is not provided, and reproduces a carrier wave having the same frequency component as the carrier wave generated by the carrier wave generating unit on the basis of a clock having the same frequency component as the power carrier wave clock induced on a power reception side of the non-contact power transmitting unit.

With this configuration, power can be transmitted in a non-contact manner between the wireless transmitting unit and the wireless receiving unit, and the carrier waves can be generated in the wireless transmitting unit and the wireless receiving unit on the basis of the same power carrier wave clock. For this reason, even though wireless data communication is performed between the wireless transmitting unit and the wireless receiving unit, a local oscillator for generating a reference clock, or an automatic frequency adjusting circuit or an A/D converter for adjusting a shift in frequency of the reference clock on transmitting and receiving sides is not required. Therefore, an increase in size of a circuit can be suppressed, high-speed data communication can be implemented in a wireless manner, and power can be transmitted without causing poor contact.

An overhead for adjusting the shift in frequency of the carrier wave between the transmitting and receiving sides can be eliminated, and throughput upon wireless communication can be improved. In addition, complete synchronous detection can be implemented, and optimum communication quality can be maintained.

Here, as the non-contact power transmitting unit, for example, coils that are electromagnetically provided on the wireless transmitting unit and the wireless receiving unit can be used.

In the wireless communication apparatus according to the first aspect of the invention, the carrier wave reproducing unit may include a voltage dropping circuit that lowers a voltage of the clock having the same frequency component as the power carrier wave clock induced on the power reception side of the non-contact power transmitting unit, and a frequency multiplying unit that multiplies a frequency of the clock whose voltage is dropped by the voltage dropping circuit.

In the wireless communication apparatus according to the first aspect of the invention, the non-contact power transmitting unit may have a first coil on a power transmission side and a second coil on the power reception side. In this case, the carrier wave reproducing unit may include a third coil that is electromagnetically coupled to the second coil and on which a third clock having the same frequency component as the power carrier wave clock by the clock having the same frequency component as the power carrier wave clock induced on the second coil is induced, and a frequency multiplying unit that receives power from the third coil and multiplies a frequency of the clock induced on the third coil.

According to a second aspect of the invention, a wireless communication apparatus includes a primary module and a secondary module that are provided separably from each other, a wireless transmitting unit that is mounted on the primary module, and modulates a carrier wave by transmission data and performs wireless communication of a signal, a wireless receiving unit that is mounted on the secondary module, and mixes the signal transmitted from the wireless transmitting unit in a wireless manner and a carrier wave having the same frequency component as the carrier wave and receives the transmission data, a power carrier wave clock generating unit that is mounted on either the primary module or the secondary module and generates a power carrier wave clock, a non-contact power transmitting unit that transmits power between the primary module and the secondary module through electromagnetic induction generated by the power carrier wave clock, a carrier wave generating unit that is provided on either the primary module or the secondary module where the power carrier wave clock generating unit is mounted, and generates a carrier wave on the basis of the power carrier wave clock, and a carrier wave reproducing unit that is provided on either the primary module or the secondary module where the power carrier wave clock generating unit is not mounted, and reproduces a carrier wave having the same frequency component as the carrier wave generated by the carrier wave generating unit on the basis of a clock having the same frequency component as the power carrier wave clock induced on a power reception side of the non-contact power transmitting unit.

With this configuration, an increase in size of a circuit can be suppressed, and data communication can be performed between the primary module and the secondary module in a wireless manner. Further, an increase in costs, power consumption, and size can be suppressed, and high-speed communication of mass data can be performed. In addition, power can be transmitted without causing poor contact.

According to a third aspect of the invention, a wireless communication apparatus includes a first casing, a second casing, a connection unit that connects the first casing and the second casing so as to change a positional relationship between the first casing and the second casing, an external wireless communication unit that is mounted on the first casing and performs external wireless communication, a display unit that is mounted on the second casing, an internal wireless communication unit that is mounted on the first casing, and modulates a carrier wave by transmission data and performs internal wireless transmission of a signal, an internal wireless receiving unit that is mounted on the second casing, and mixes the signal transmitted from the internal wireless transmitting unit in an internal wireless manner and a carrier wave having the same frequency component as the carrier wave and receives the transmission data in an internal wireless manner, a power carrier wave clock generating unit that is mounted on either the first casing or the second casing and generates a power carrier wave clock, a non-contact power transmitting unit that transmits power between the first casing unit and the second casing through electromagnetic induction generated by the power carrier wave clock, a carrier wave generating unit that is provided on either the first casing or the second casing where the power carrier wave clock generating unit is mounted, and generates a carrier wave on the basis of the power carrier wave clock, and a carrier wave reproducing unit that is provided on either the first casing or the second casing where the power carrier wave clock generating unit is not mounted, and reproduces a carrier wave having the same frequency component as the carrier wave generated by the carrier wave generating unit on the basis of a clock having the same frequency component as the power carrier wave clock induced on a power reception side of the non-contact power transmitting unit.

With this configuration, even though the size of display data to be transmitted from the first casing to the second casing is increased with large screen and large definition of the display unit mounted on the second casing, the display data can be transmitted to the display unit at high speed without complicating the configuration of the connection unit, and power can be transmitted without causing poor contact. For this reason, a small and thin wireless communication terminal and high reliability can be implemented. In addition, a wireless communication terminal having a large screen and multi-functionality can be implemented without impairing portability of the wireless communication terminal.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a wireless communication apparatus and a method of manufacturing the same according to embodiments of the invention will be described with reference to the drawings.

Figure 1:
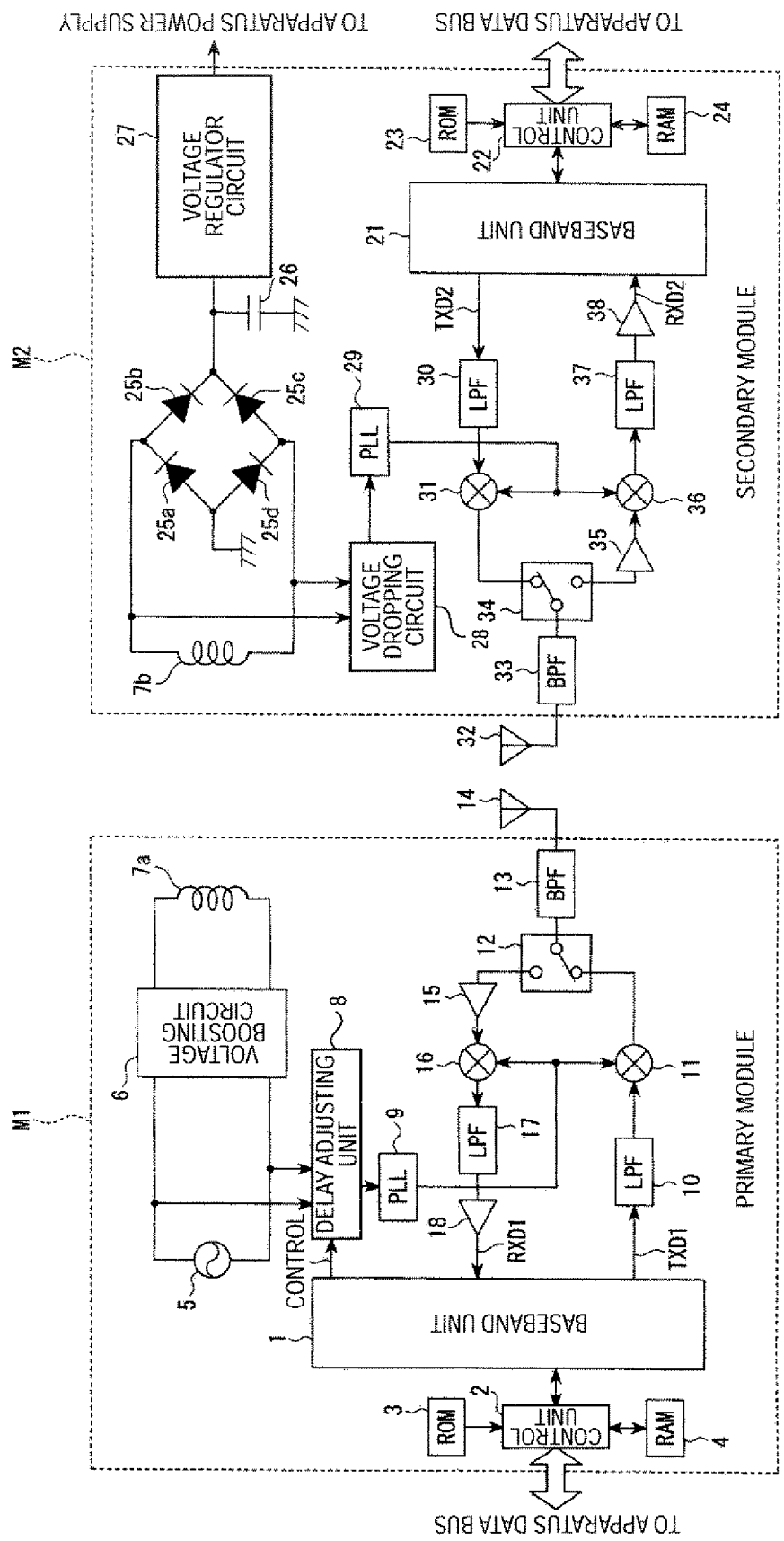
FIG. 1 is a block diagram showing the schematic configuration of a wireless communication apparatus according to a first embodiment of the invention.

FIG. 1 is a block diagram showing the schematic configuration of a wireless communication apparatus according to a first embodiment of the invention.

Referring to FIG. 1, in a primary module M1, a baseband unit 1 that performs a baseband signal processing, a control unit 2 that performs the control of the baseband unit 1 and the like, a ROM 3 that stores various programs for operating the primary module M1, a RAM 4 that provides a work area when the control unit 2 executes a processing or stores the processing result, a power carrier wave clock generating unit 5 that generates a power carrier wave clock, a voltage boosting circuit 6 that boosts the power carrier wave clock, a primary coil 7a (power transmission side) that generates a voltage on a secondary coil 7b on the basis of electromagnetic induction, a delay adjusting unit 8 that adjusts a phase of the power carrier wave clock, a PLL circuit 9 that generates a carrier wave by multiplying a frequency of the power carrier wave clock, a low pass filter 10 that attenuates an unnecessary high component included in a transmission signal TXD1 output from the baseband unit 1, a mixer 11 that up-converts the transmission signal TXD1 by mixing the transmission signal TXD1 to the carrier wave, an internal wireless communication antenna 14 that performs transmission/reception of an electric wave for internal wireless communication, a band pass filter 13 that attenuates an unnecessary frequency component from the signal received by the internal wireless communication antenna 14, a low noise amplifier 15 that amplifies the signal received by the internal wireless communication antenna 14, a mixer 16 that down-converts the received signal by mixing the received signal output from the low noise amplifier 15 to the carrier wave, a low pass filter 17 that attenuates an unnecessary high component included in the down-converted received signal, a buffer is that amplifies the received signal output from the low pass filter 17 and outputs a received signal RXD1 and a switch 12 that switches transmission/reception in the primary module M1 are provided.

In a secondary module M2, a baseband unit 21 that performs a baseband signal processing, a control unit 22 that performs the control of the baseband unit 21 and the like, a ROM 23 that stores various programs for operating the secondary module M2, a RAM 24 that provides a work area when the control unit 22 executes a processing or stores the processing result, a secondary coil 7b (power reception side) that generates a voltage on the basis of electromagnetic induction with the primary coil 7a, diodes 25a to 25d that are brought into bridge connection so as to rectify the voltage generated on the secondary coil 7b, a capacitor 26 that generates a direct current voltage by accumulating an electric charge, a voltage regulator circuit 27 that performs voltage adjustment, a voltage dropping circuit 28 that drops the voltage generated on the secondary coil 7b, a PLL circuit 29 that generates a carrier wave by multiplying a frequency of the power carrier wave clock dropped by the voltage dropping circuit 28, a low pass filter 30 that attenuates an unnecessary high component included in a transmission signal TXD2 output from the baseband unit 21, a mixer 31 that up-converts the transmission signal TXD2 by mixing the transmission signal TXD2 to the carrier wave, an internal wireless communication antenna 32 that performs transmission/reception of an electric wave for internal wireless communication, a band pass filter 33 that attenuates an unnecessary frequency component from the signal received by the internal wireless communication antenna 32, a low noise amplifier 35 that amplifies the signal received by the internal wireless communication antenna 32, a mixer 36 that down-converts the received signal by mixing the received signal output from the low noise amplifier 35 to the carrier wave, a low pass filter 37 that attenuates an unnecessary high component included in the down-converted received signal, a butter 38 that amplifies the received signal output from the low pass filter 37 and outputs a received signal RXD2 to the baseband unit 21, and a switch 34 that switches transmission/reception in the secondary module M2 are provided.

When the transmission data TXD1 is transmitted from the primary module M1 to the secondary module M2, the switch 12 is switched to the mixer 11, and the switch 34 is switched to the low noise amplifier 35. The power carrier wave clock generating unit 5 generates a power carrier wave clock and sends the generated power carrier wave clock to a delay adjusting unit 8. Then, after a phase of the power carrier wave clock is adjusted by the delay adjusting unit 8, a frequency of the power carrier wave clock is multiplied by the PLL circuit 9, and the power carrier wave clock having the multiplied frequency is output to the mixers 11 and 16. Further, the baseband unit 1 generates the transmission data TXD1, and output the generated transmission data TXD1 to the mixer 11 through the low pass filter 10. Then, the mixer 11 mixes the transmission data TXD1 output from the baseband unit 1 and the carrier wave output from the PLL circuit 9, and superimposes the transmission data TXD1 on the carrier wave.

If the transmission data TXD1 is superimposed on the carrier wave, the transmission data is sent to the internal wireless communication antenna 14 through the switch 12 and the band pass filter 13, and then is sent to a space as an electric wave through the internal wireless communication antenna 14. Next, if the transmission data is transmitted through the internal wireless communication antenna 14, the transmission data is received through the internal wireless communication antenna 14.

Further, the power carrier wave clock generated by the power carrier wave clock generating unit 5 is sent to the voltage boosting circuit 6, then is boosted by the voltage boosting circuit 6, and subsequently is sent to the primary coil 7a. Then, the power carrier wave clock is sent to the primary coil 7a, a voltage (clock) having a frequency component of the power carrier wave clock is induced by electromagnetic induction with the secondary coil 7b, then is smoothed by the diodes 25a to 25d and the capacitor 26, and subsequently is sent to an apparatus power supply through the voltage regulator circuit 27.

The voltage induced on the secondary coil 7b is sent to the voltage dropping circuit 28, then is dropped by the voltage dropping circuit 28, and subsequently is sent to the PLL circuit 29. Next, the frequency component of the power carrier wave clock induced on the secondary coil 7b is multiplied by the PLL circuit 29 and then is output to the mixers 31 and 36. That is, a carrier wave having the same frequency component as the carrier wave generated by the PLL circuit 9 of the primary module M1 is reproduced by the PLL circuit 29.

Next, the received signal received through the internal wireless communication antenna 32 is sent to the low noise amplifier 35 through the switch 34 after an unnecessary frequency component is attenuated by the band pass filter 33 therefrom. Next, if the received signal is sent to the low noise amplifier 35, it is amplified by the low noise amplifier 35 and then is sent to the mixer 36.

Next, the mixer 36 mixes the received signal sent from the low noise amplifier 35 and the carrier wave sent from the PLL circuit 29, and performs down conversion of the received signal. Next, the received signal RXD2 down-converted by the mixer 36 is sent to the baseband unit 21 through the buffer 38 after an unnecessary frequency component is attenuated by the low pass filter 37.

Meanwhile, when the transmission data TXD2 is transmitted from the secondary module M2 to the primary module M1, the switch 12 is switched to the low noise amplifier 15, and the switch 34 is switched to the mixer 31. The power carrier wave clock generating unit 5 generates a power carrier wave clock and sends the generated power carrier wave clock to the delay adjusting unit 8. Next, after the phase of the power carrier wave clock is adjusted by the delay adjusting unit 8, the frequency of the power carrier wave clock is multiplied by the PLL circuit 9, and then the power carrier wave clock having the multiplied frequency is output to the mixers 11 and 16

The power carrier wave clock generated by the power carrier wave clock generating unit 5 is sent to the voltage boosting circuit 6, then is boosted by the voltage boosting circuit 6, and subsequently is sent to the primary coil 7a. Next, if the power carrier wave clock is sent to the primary coil 7a, a voltage having the frequency component of the power carrier wave clock is induced by electromagnetic induction with the secondary coil 7b, then is smoothed by the diodes 25a to 25d and the capacitor 26, and subsequently is sent to the apparatus as power supply through the voltage regulator circuit 27.

The voltage induced on the secondary coil 7b is sent to the voltage dropping circuit 28, then is dropped by the voltage dropping circuit 28, and subsequently is sent to the PLL circuit 29. Next, the frequency component of the power carrier wave clock induced on the secondary coil 7b is multiplied by the PLL circuit 29, and the power carrier wave clock having the multiplied frequency component is sent to the mixers 31 and 36.

The baseband unit 21 generates the transmission data TXD2, and outputs the generated transmission data TXD2 to the mixer 31 through the low pass filter 30. Next, the mixer 31 mixes the transmission data TXD2 output from the baseband unit 21 and the carrier wave output from the PLL circuit 29 and superimposes the transmission data TXD2 on the carrier wave.

If the transmission data TXD2 is superimposed on the carrier wave, the transmission data is sent to the internal wireless communication antenna 32 through the switch 34 and the base band filter 33, and then is output to a space as an electric wave through the internal wireless communication antenna 32. Next, if the transmission data is transmitted through the internal wireless communication antenna 32, the transmission data is transmitted through the internal wireless communication antenna 32 and then is received through the internal wireless communication antenna 14.

The received signal received through the internal wireless communication antenna 14 is sent to the low noise amplifier 13 through the switch 12 after an unnecessary frequency component is attenuated by the band pass filter 13. Next, the received signal is sent to the low noise amplifier 15 then is amplified by the low noise amplifier 15, and subsequently is sent to the mixer 16.

The mixer 16 mixes the received signal sent from the low noise amplifier 15 and the carrier wave sent from the PLL circuit 9 and performs down conversion of the received signal. Next, the received signal RXD1 down-converted by the mixer 16 is sent to the baseband unit 1 through the buffer 18 after an unnecessary high component is attenuated by the low pass filter 17.

Accordingly, power can be transmitted between the primary module M1 and the secondary module M2 that are separately provided, and the carrier wave can be generated on the basis of the same power carrier wave clock in the primary module M1 and the secondary module M2. For this reason, even though wireless data communication is performed between the primary module M1 and the secondary module M2, a local oscillator for generating a reference clock, or an automatic frequency adjusting circuit or an A/D converter for adjusting a shift in frequency of the reference clock between the primary module M1 and the secondary module M2 is not required. Therefore, an increase in size of a circuit can be suppressed, and high-speed data communication can be implemented in a wireless manner. In addition, power can be transmitted without causing poor contact.

An overhead for adjusting a shift in frequency of the carrier wave between the primary module M1 and the secondary module M2 can be eliminated, and throughput upon wireless communication can be improved. Further, complete synchronous detection can be implemented, and optimum communication quality can be maintained. In addition, an on-time can be made short upon intermittent transmission/reception, and thus power consumption can be reduced.

In the above-described first embodiment, the power carrier wave clock generating unit is provided on the wireless transmission side. However, the power carrier wave clock generating unit may be provided on the wireless reception side. The same can be applied to the following second to fourth embodiments.

Figure 2:
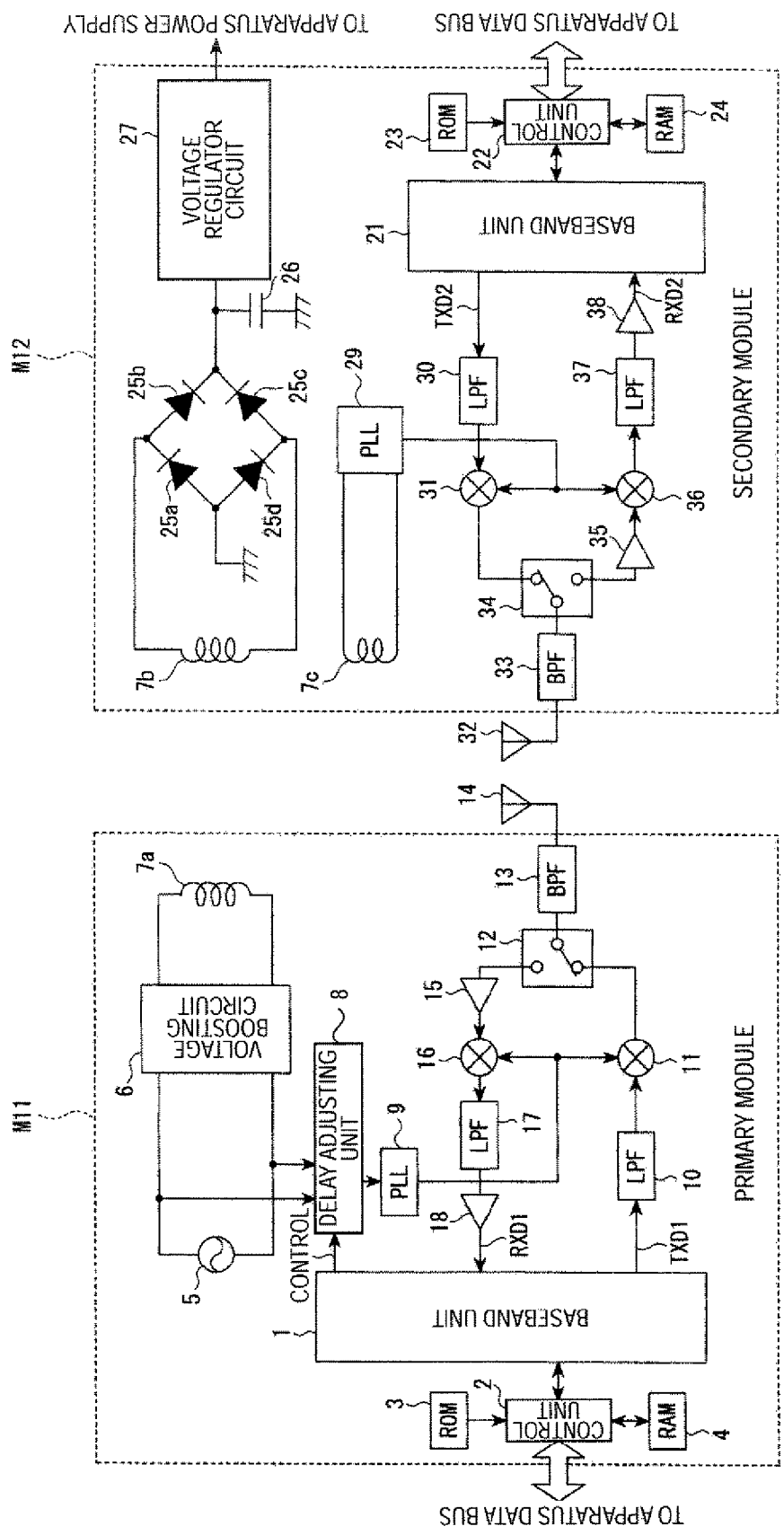
FIG. 2 is block diagram showing the schematic configuration of a wireless communication apparatus according to a second embodiment of the invention.

FIG. 2 is a block diagram showing the schematic configuration of a wireless communication apparatus according to a second embodiment of the invention.

Referring to FIG. 2, in the secondary module M2, instead of the voltage dropping circuit 28 of FIG. 1, a tertiary coil 7c that is electromagnetically coupled to the secondary coil 7b is provided.

A voltage (clock) induced on the tertiary coil 7c is supplied to the PLL circuit 29, and the PLL circuit 29 can multiply the frequency component of the power carrier wave clock induced on the tertiary coil 7c and output the power carrier wave to the mixers 31 and 36.

Accordingly, it is unnecessary to provide the voltage dropping circuit 28 of FIG. 1, and thus the circuit configuration is simplified. In additions the frequency component of the power carrier wave clock can be efficiently extracted.

The above-described wireless communication apparatus can be applied, for example, to a cellular phone, a video camera, a PDA (Personal Digital Assistant), a notebook type personal computer, and the like. Further, in the above embodiments, a method that performs communication between the primary module M1 and the secondary module M2 has been described. However, the invention may be applied to wireless communication between a first casing and a second casing that are connected to each other through a hinge or wireless communication in an apparatus that is used as a single body.

Figure 3B:
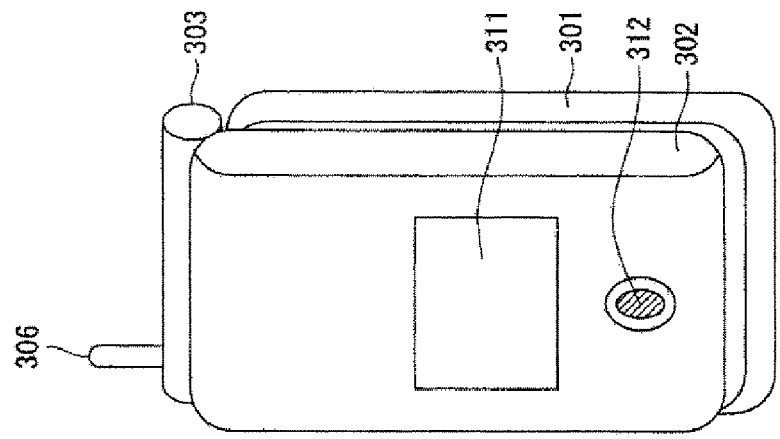
FIGS. 3A and 3B are diagrams showing a clamshell cellular phone to which a wireless communication apparatus according to a third embodiment of the invention is applied.
Figure 3A:
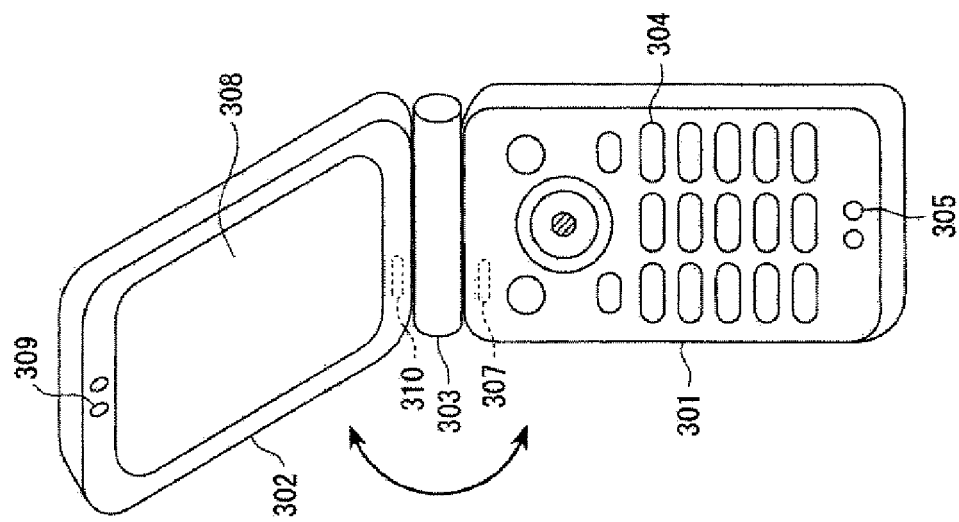

FIGS. 3A and 3B are diagrams showing a clamshell cellular phone that is a wireless communication apparatus as a third embodiment of the invention. The clamshell cellular phone of FIGS. 3A and 3B substantially has the same configuration as the wireless communication apparatus of the first or second embodiment described with reference to FIG. 1 or 2 in terms of a circuit system, and has features in terms of casings and mounting.

FIG. 3A is a perspective view showing a state where the clamshell cellular phone is opened FIG. 3B is a perspective view showing a state where the clamshell cellular phone is closed.

Referring to FIGS. 3A and 3B, operating buttons 304 are disposed at a surface of a first casing 301, and a microphone 305 is provided at a lower end of the first casing 301. An external wireless communication antenna 306 is attached at an upper end of the first casing 301. Further, a display unit 308 is provided at a surface (a surface viewed in an opened state) of a second casing 302, and a speaker is provided at an upper end of the second casing 302.

A display body 311 and an imaging device 312 are provided at a rear surface (an outer surface in a closed state) of the second casing 302. Moreover, as the display unit 308 and the display body 311, a liquid crystal display panel, an organic EL panel, or a plasma display panel is applied. Further, as the imaging device 312, a CCD, a CMOS sensor or the like is applied.

In the first casing 301 and the second casing 302, internal wireless communication antennas 307 and 310 for internal wireless communication between the first casing 301 and the second casing 302 are provided, respectively. As shown in the drawings, the first casing 301 and the second casing 302 are connected to each other through a hinge 303 as a coupling mechanism (a connection unit). The second casing 302 rotates with the hinge 303 as a fulcrum, such that the second casing 302 is folded onto the first casing 301.

In the above-described manner, since the second casing 302 is closed onto the first casing 301, the operating buttons 304 can be protected by the second casing 302, and the operating buttons 304 can be prevented from erroneously operating when a user takes the cellular phone. Further, when the second casing 302 is opened from the first casing 301, the user can operate the operating buttons 304 while viewing the display unit 308, talk over the phone using the speaker 309 and the microphone 305, or perform imaging while operating the operating buttons 304.

Since the clamshell structure is used, the display unit 308 can be disposed at the substantially entire surface of the second casing 302, and the size of the display unit 308 can be expanded without damaging portability as a cellular phone. As a result, visibility can be improved.

According to the above configuration, in the cellular phone, the internal wireless communication antenna 307 is provided in the first casing 301, and the internal wireless communication antenna 310 is provided in the second casing 302. Therefore, data transmission between the first casing 301 and the second casing 302 is performed by internal wireless communication using the internal wireless communication antennas 307 and 310.

In the cellular phone of FIGS. 3A and 3B, the primary module M1 of FIG. 1 or 2 is provided in the first casing 301, and the secondary module M2 of FIG. 1 or 2 is provided in the second casing 302.

The internal wireless communication antenna 307 corresponds to the internal wireless communication antenna 14 of FIG. 1 or 2, and the internal wireless communication antenna 310 corresponds to the internal wireless communication antenna 32 of FIG. 1 or 2.

According to the above configuration, for example, image data or sound data that is imported to the first casing 301 through the external wireless communication antenna 306 is sent to the second casing 302 by internal wireless communication using the internal wireless communication antennas 307 and 310, and then an image may be displayed on the display unit or sound may be output from the speaker 309.

A captured image by the imaging device 312 is sent from the second casing 302 to the first casing 301 by internal wireless communication using the internal wireless communication antennas 307 and 310. Then, the captured image may be sent to the outside through the external wireless communication antenna 306.

As described above, it is unnecessary to perform data transmission between the first casing 301 and the second casing 302 in a wired manner. Further, it is unnecessary to connect a flexible wiring board having a plurality of pins to the hinge 303.

Power can be transmitted between the first casing 301, in which the primary module M1 is provided, and the second casing 302, in which the secondary module M2 is provided, in a non-contact manner. Further, the carrier wave can be generated on the basis of the same power carrier wave clock in the primary module M1 and the secondary module M2. For this reason, power can be transmitted without connecting an electrical wire for transferring power between the first casing 301 and the second casing 302 to the hinge 303. Further, even though wireless data communication is performed between the primary module M1 and the secondary module M2, a local oscillator for generating a reference clock, or an automatic frequency adjusting circuit or an A/D converter for adjusting a shift in frequency of the reference clock between the primary module M1 and the secondary module M2 is not required. Therefore, an increase in size of a circuit can be suppressed, and high-speed data communication can be implemented in a wireless manner.

In this embodiment, the clamshell cellular phone has been described. However, the above-described wireless communication technology can be applied to various electronic apparatuses, such as a rotary cellular phone and a notebook type personal computer.

Figure 4:
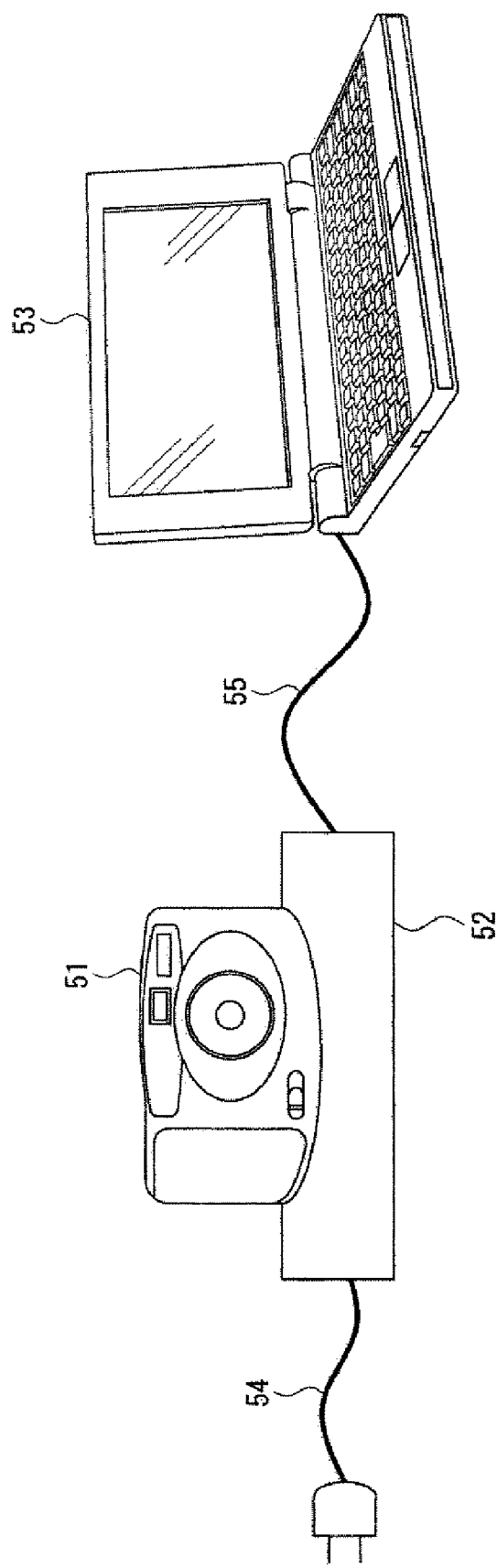
FIG. 4 is an external view showing the system configuration to which a wireless communication apparatus according to a fourth embodiment of the invention is applied.

FIG. 4 is an external view showing the system configuration to which a wireless communication apparatus according to a fourth embodiment of the invention is applied.

In FIG. 4, it is assumed that the secondary module M2 of FIG. 1 is mounted on a digital camera 51, and the primary module M1 of FIG. 1 is mounted on a charging stand 52. Then, alternating current power is supplied to the charging stand 52 through an AC adaptor 54, and the charging stand 52 is connected to a personal computer 53 through a wired cable 55 based on a USB standard or the like.

The charging stand 52 can charge the digital camera 51 through non-contact power transmission and perform wireless data communication with the digital camera 51. Then, the charging stand 52 can transfer digital data to the personal computer 53.

The connection of the charging stand 52 and the personal computer 53 may be made using wireless connections in addition to the wired cable 55. Further, in the embodiment of FIG. 4, the description has been given by way of the digital camera 51, but may be applied to a cellular phone or a video camera.

The entire disclosure of Japanese Patent Application Nos. 2005-304314, filed Oct. 19, 2005 and 2006-226007, filed Aug. 23, 2006 are expressly incorporated by reference herein.

What is claimed is:

1. A wireless communication apparatus comprising:
    a wireless transmitting unit that modulates transmission data by a carrier wave and performs wireless communication of the modulated signal;
    a wireless receiving unit that mixes the modulated signal transmitted from the wireless transmitting unit and a carrier wave having the same frequency component as the carrier wave generated by the wireless transmitting unit and receives the transmission data;
    a power carrier wave clock generating unit that is provided on one of the wireless transmitting unit and the wireless receiving unit so as to generate a power carrier wave clock;
    a non-contact power transmitting unit that transmits power between the wireless transmitting unit and the wireless receiving unit through electromagnetic induction generated by the power carrier wave clock;
    a carrier wave generating unit that is mounted on either the wireless transmitting unit or the wireless receiving unit where the power carrier wave clock generating unit is provided, and generates the carrier wave on the basic of the power carrier wave clock; and
    a carrier wave reproducing unit that is mounted on either the wireless transmitting unit or the wireless receiving unit where the power carrier wave clock generating unit is not provided, and reproduces the carrier wave having the same frequency component as the carrier wave generated by the carrier wave generating unit on the basis of a clock having the same frequency component as the power carrier wave clock induced on a power reception side of the non-contact power transmitting unit.

2. The wireless communication apparatus according to claim 1, wherein the carrier wave reproducing unit includes:
a voltage dropping circuit that lowers a voltage of the clock having the same frequency component as the power carrier wave clock induced on the power reception side of the non-contact power transmitting unit, and
a frequency multiplying unit that multiplies a frequency of the clock whose voltage is dropped by the voltage dropping circuit.

3. The wireless communication apparatus according to claim 1,
wherein the non-contact power transmitting unit has a first coil on a power transmission side and a second coil on the power reception side, and
the carrier wave reproducing unit includes:
a third coil that is electromagnetically coupled to the second coil and on which a third clock having the same frequency component as the power carrier wave clock by the clock having the same frequency component as the power carrier wave clock induced on the second coil is induced, and
a frequency multiplying unit that receives power from the third coil and multiplies a frequency of the clock induced on the third coil.

4. A wireless communication apparatus comprising:
a primary module and a secondary module that are provided separately from each other;
a wireless transmitting unit that is mounted on the primary module, and modulates transmission data by a carrier wave and performs wireless communication of the modulated signal;
a wireless receiving unit that is mounted on the secondary module, that mixes the modulated signal transmitted from the wireless transmitting unit and a carrier wave having the same frequency component as the carrier wave generated by the wireless transmitting unit and receives the transmission data;
a power carrier wave clock generating unit that is mounted on either the primary module or the secondary module and generates a power carrier wave clock;
a non-contact power transmitting unit that transmits power between the primary module and the secondary module through electromagnetic induction generated by the power carrier wave clock;
a carrier wave generating unit that is provided on either the primary module or the secondary module where the power carrier wave clock generating unit is mounted, and generates the carrier wave on the basis of the power carrier wave clock; and
a carrier wave reproducing unit that is provided on either the primary module or the secondary module where the power carrier wave clock generating unit is not mounted, and reproduces the carrier wave having the same frequency component as the carrier wave generated by the carrier wave generating unit on the basis of a clock having the same frequency component as the power carrier wave clock induced on a power reception side of the non-contact power transmitting unit.

5. A wireless communication apparatus comprising:
a first casing;
a second casing;
a connection unit that connects the first casing and the second casing so as to change a positional relationship between the first casing and the second casing;
an external wireless communication unit that is mounted on the first casing and performs external wireless communication;
a display unit that is mounted on the second casing;
an internal wireless communication unit that is mounted on the first casing, and modulates transmission data by a carrier wave and performs wireless communication of the modulated signal;
an internal wireless receiving unit that is mounted on the second casing, and mixes the modulated signal transmitted from the internal wireless transmitting unit and a carrier wave having the same frequency component as the carrier wave generated by the internal wireless communication unit and receives the transmission data in an internal wireless manner;
a power carrier wave clock generating unit that is mounted on either the first casing or the second casing and generates a power carrier wave clock;
a non-contact power transmitting unit that transmits power between the first casing unit and the second casing through electromagnetic induction generated by the power carrier wave clock;
a carrier wave generating unit that is provided on either the first casing or the second casing where the power carrier wave clock generating unit is mounted, and generates the carrier wave on the basis of the power carrier wave clock; and
a carrier wave reproducing unit that is provided on either the first casing or the second casing where the power carrier wave clock generating unit is not mounted, and reproduces the carrier wave having the same frequency component as the carrier wave generated by the carrier wave generating unit on the basis of a clock having the same frequency component as the power carrier wave clock induced on a power reception side of the non-contact power transmitting unit.

* * * * *